United States Patent [19]

Clabbers et al.

[11] Patent Number: 4,925,178
[45] Date of Patent: May 15, 1990

[54] DEVICE FOR CONVEYING SHEETS WITH INTERSECTING CONVEYOR PATHS

[75] Inventors: Wilhelmus G. M. Clabbers; Johannes H. A. Dinnissen; Johannes H. B. Nabuurs, all of Venlo, Netherlands

[73] Assignee: Oce-Nederland B.V., Netherlands

[21] Appl. No.: 245,776

[22] Filed: Sep. 16, 1988

[30] Foreign Application Priority Data

Sep. 23, 1987 [NL] Netherlands ............... 8702263

[51] Int. Cl.$^5$ ............................................. B65H 29/58
[52] U.S. Cl. ..................................... 271/186; 271/291; 271/303; 271/902
[58] Field of Search .................. 271/291, 301, 902, 9, 271/303, 305, 186, 195; 406/181, 182, 183

[56]    References Cited
U.S. PATENT DOCUMENTS

| 3,178,178 | 4/1965 | Zeutschel | 271/195 X |
| 3,489,178 | 1/1970 | Kice | 406/183 |
| 3,705,413 | 12/1972 | Cronquist | 271/195 X |
| 4,049,255 | 9/1977 | Stange | 271/902 X |
| 4,699,367 | 10/1987 | Russel | 271/902 X |
| 4,817,933 | 4/1989 | Honjo | 271/902 X |

Primary Examiner—Richard A. Schacher
Attorney, Agent, or Firm—Reed Smith Shaw & McClay

[57]    ABSTRACT

In a device for conveying sheets wherein two conveying paths intersect, a moveable guide member is provided at the intersection such that in a first position it connects both parts of the first conveyor path while at the same time it disconnects both parts of the second conveyor path and in a second position has the reverse function on the first and second conveyor paths. Preferably, while the guide member is in the first position, a sheet can be conveyed form one part of the second conveyor path to one part of the first conveyor path via a third conveyor path which does not pass through the intersection. Similarly, while the guide member is in the second position, a sheet can also be conveyed from one part of the first conveyor path to one part of the second conveyor path via the third conveyor path.

3 Claims, 3 Drawing Sheets

DEVICE FOR CONVEYING SHEETS WITH INTERSECTING CONVEYOR PATHS

FIELD OF THE INVENTION

The present invention relates to a device for conveying sheets having two conveyor paths which intersect. A plurality of path guides form the first and the second conveyor paths and each conveyor path comprises a feed section and a discharge section situated on either side of the intersection.

BACKGROUND OF THE INVENTION

Devices for conveying sheets having two conveyor paths which intersect are often used in copying machines to feed originals or copies to or from processing stations. (See, for example, the device disclosed in U.K. Patent No. 1,397,605). This conveying device does not have any guide elements in the intersection of the conveying paths. One disadvantage of such a conveying device is that a sheet, particularly if it is limp, curled or damaged at the front edge, may stick in the intersection or take the wrong path and thus cause a malfunction in the copying machine.

Other conveying devices use sheet guides which switch between positions to direct the sheets in one direction or other. (See, for example, the device disclosed in U.S. Pat. No. 3,331,276). It is also known to combine a number of guides in order to form a system of intersecting conveyor paths. (See, for example, the devices disclosed in West German Offenlegungsschrift 3341413 and U.S. Pat. No. 4,264,067). To obtain a reliable conveying device using several guides, however, a number of switches and other elements are required as well as an extensive control and monitoring system. As a result, the entire arrangement becomes very complex, expensive and therefore unattractive for practical use.

Japanese Patent Application 58-202247 uses a cylindrical element having a slot in the form of an arc of a circle extending over the width as a guide. By rotating the cylinder, the location of the arced slot is changed and thus the direction of the conveyor paths. Japanese Patent Application 60-52458 discloses a paper inverter having an hour-glass shaped guide element which can be turned through 90°. In the first position, a sheet can be conveyed from a feed section into a first inverter. By turning the element 90° to a second position, the sheet can be conveyed from the first inverter to the discharge section while at the same time a second sheet can be conveyed from the feed section to a second inverter. Finally, in an intermediate position of 45°, the element contains a groove which directly connects the feed section and the discharge section. The problem with guide elements having slots and grooves as shown in these references is that they still may be blocked, especially if the sheet is limp, curled or damaged at the front edge.

It would be desirable, therefore, in a device for conveying sheets with two intersecting conveyor paths to have a simple path guide which obviated the above-described disadvantages and provided a compact, cheap and reliable conveying device using a minimum number of parts.

SUMMARY OF THE INVENTION

Generally, the present invention provides a device for conveying sheets having at least two conveyor paths which intersect and a moveable guide member at the intersection. The guide member can be moved between two positions. In one position, it keeps open the entrance to the first discharge section while at the same time it blocks the entrance to the second discharge section. In the other position, it blocks the entrance to the first discharge section and it keeps open the entrance to the second discharge section.

In a device constructed in this manner, a sheet coming from a feed section is always guided by the guide member to the appropriate discharge section of the appropriate conveyor path. The blocking action of the guide member makes it impossible for the sheet to enter the discharge section of the wrong conveyor path. Since only one guide member is used, only a simple activation means such as a combination of an electromagnet and a spring is necessary for moving it from one position to the other and back.

The guide member in the present invention can be embodied in a variety of ways. In a first embodiment, the guide member comprises a rotatable element provided with a substantially straight slot extending over the working width of the device. The slot adjoins the feed section and the discharge section, respectively, of a conveyor path in each of the two positions. The slot is wider at the end adjoining the feed section than at the end adjoining the discharge section and nay taper down over the entire length of the slot or only part of it. The slot may be formed in a cylinder or it can be formed by two plates situated some distance apart.

In another embodiment, the guide member comprises a slidable element which extends over the working width of the device and has a plurality of adjoining sides, one side forming part of the guide means of the first conveyor path and the second side forming part of the guide means of the second conveyor path. In the first position, the guide member is moved such that the second side adjoins the other part of the guide means of the second conveyor path and blocks the entrance to the second discharge section. In the second position, the guide member is moved such that the first side adjoins the other part of the guide means of the first conveyor path and blocks the entrance to the first discharge section.

In another embodiment, the guide member has a third side which forms part of the guide means of a third conveyor path which does not pass through the intersection but which is connected to one part of each of the first and second conveyor paths. When the guide member is in the first position, the entrance to part of the second conveyor path is blocked. When the guide member is in the second position, the entrance to part of the first conveyor path is blocked.

Other details, objects and advantages of the present invention will become more readily apparent from the following description of a presently preferred embodiment thereof.

BRIEF DESCRIPTION OF THE DRAWINGS

In the accompanying drawings, a preferred embodiment of the present invention is illustrated, by way of example only, wherein.

DESCRIPTION OF THE PREFERRED EMBODIMENT

Figure 1:
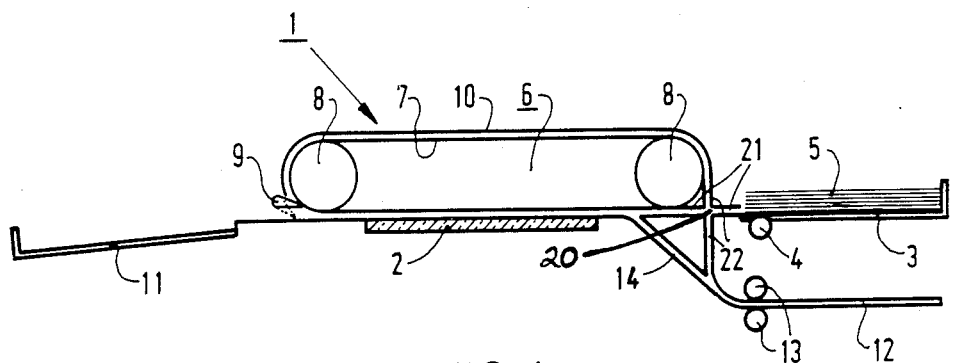
FIG. 1 shows a known sheet feeding device for originals which has an inverter and intersecting conveyor paths.

FIG. 1 illustrates a sheet feeding device 1 which can easily handle originals that are printed either on one side or both sides. It has two conveyor paths which intersect and is typically used in a copying machine. The feeding device 1 for the originals comprises: an exposure platen 2; a stock tray 3 with a separating mechanism a conveyor device 6, preferably consisting of inter alia an endless belt 7 trained about and driven by rollers 8 and a switch 9 which can be moved between two positions; a receiving tray 11; and an inverter 12 with drive rollers 13. If the originals for copying are printed on only one side, they are placed in the stock tray 3 with the printed side down. The originals are taken one by one from beneath the pile 5 by the separating mechanism which for example can be a friction roller, and are fed via conveyor path 21 to conveyor device 6. The endless belt 7, which is always driven in one direction by the rollers 8, conveys the original taken from the pile to the exposure platen 2 whereupon the original is stopped so that it can be exposed the required number of times. Belt 7 then conveys the original directly onto the receiving tray 11 since switch 9 is in its first position.

When it is necessary to copy originals which are printed on both sides, they are placed with the front side down in the stock tray 3. Separating mechanism 4 takes an original from beneath the pile 5 and feeds it to conveyor device 6 via conveyor path 21. Endless belt 7 then takes over the conveyance and stops the original for the required number of exposures on the exposure platen 2 with the front side downwards. Switch 9 is then moved to the second position so that belt 7 feeds the original via a return path 10 and conveyor path 22 to inverter 12 which is situated beneath the stock tray 3. The conveyor path 22 intersects the conveyor path 21 at an intersection 20. Drive rollers 13 feed the original completely into the inverter with the back of the original now being situated downwards. By reversing the direction of rotation of the drive rollers 13, the original is then discharged from the inverter 12, and conveyed to conveyor device 6 via a third conveyor path 14. Endless belt 7 again takes over conveyance and stops the original on the exposure platen 2 where the back of the original is exposed the required number of times. Belt 7 then conveys the original onto the receiving tray 11 after switch 9 has been returned to the first position. The control for the feeding device 1 is constructed so that two or more originals can be in progress simultaneously.

Figure 2:
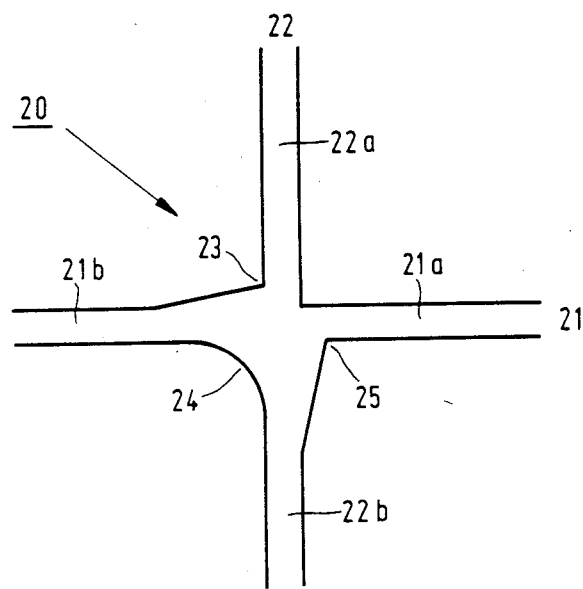
FIG. 2 is an enlarged detail of the intersection of the conveyor paths of the device shown in FIG. 1.

FIG. 2 is an enlargement of the intersection 20 between conveyor paths 21 and 22 showing a known construction therefor. The intersection divides the conveyor paths 21 and 22 into a feed section 21a and 22a and a discharge section 21b and 22b. To help eliminate any malfunctions, the guides at the intersection are bent back slightly at the corners 23, 24 and 25 of the discharge sections 21b and 22b so that the sheets coming from the feed section can be received more satisfactorily. This slight bend, however, is not adequate to eliminate all paper jams and malfunctions. Sheets which are too limp or damaged at the front edge may stick in the intersection 22 or may enter the feed or discharge section of the wrong conveyor path. Malfunctions of this kind can be eliminated by replacing this construction with one of the embodiments of the present invention which are described in detail hereinafter.

Figure 3:
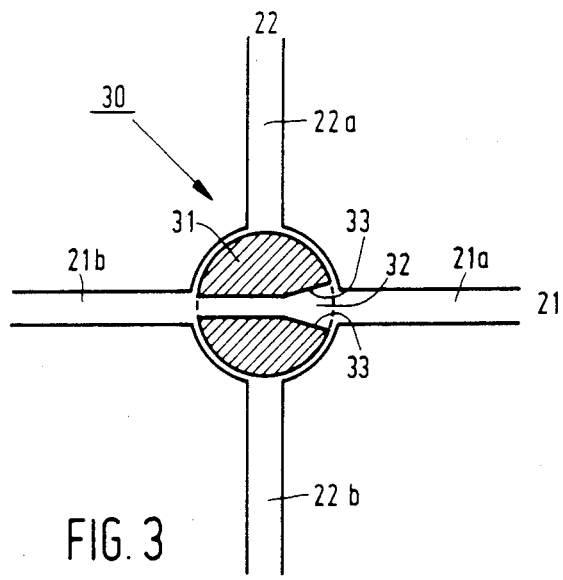
FIG. 3 shows an embodiment of the present invention wherein the guide member is a cylinder with a straight slot.

One embodiment of an intersection used in the present invention is shown in FIG. 3. Preferably, it comprises a cylindrical element 31 which is rotatable about its axis and has a straight slot 32 disposed diametrically over the working width of the device. The side walls 33 of the slot 32 which form the guides at the intersection 30 are bent back at the side closest to the feed section 21a of the conveyor path 21 with respect to the guides of the conveyor path 21 so that the slot opening at this side is wider than the guides of the feed section 21a. As a result, the sheets being fed are not obstructed at the transition from the guides of the feed section 21a to the guides of the guide member. For the same reason, the side walls 33 are bent inwards at the side closest to the discharge section 21b so that the slot opening at this side is narrower than the guides of the discharge section 21b. The cylindrical element 31 can be rotated from the first position shown in FIG. 3 to a second position in which the slot 32 forms a direct connection between the feed section 22a and the discharge section 22b of conveyor path 22. Then it can be turned rotated back to the first position.

Figure 4:
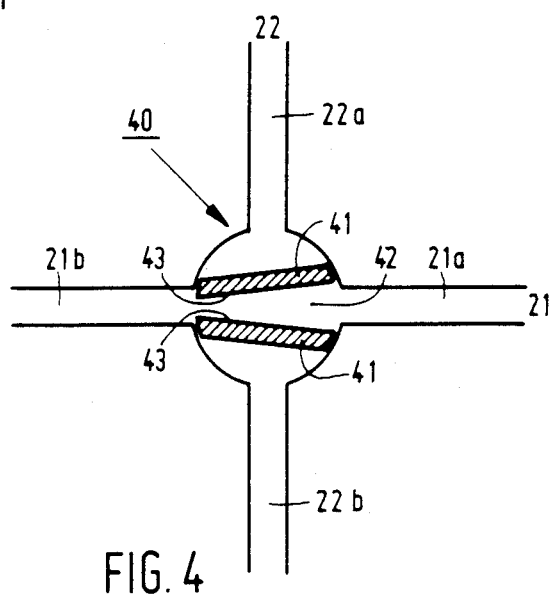
FIG. 4 shows an embodiment of the present invention wherein the guide member comprises two plates forming a tapered slot.

FIG. 4 shows another embodiment of an intersection used in the present invention having a guide member comprising two plates 41 disposed at some distance from one another and having a slot 42 extending between them over the working width of the device. The two plates are so disposed that the side walls 43 of slot 42 which form the guides at the intersection 40 are bent back at the side of feed section 21a with respect to the guides of conveyor path 21 and are bent inwards at the side of the discharge sections 21b with respect to the guides of conveyor path 21 to prevent sheets which are limp or damaged at the front edge from being stuck in the intersection 40. Plates 41 can be moved from the position shown in FIG. 4 in which slot 42 forms part of conveyor path 21 into a position in which slot 42 forms part of conveyor path 22, and back again.

Figure 5A:
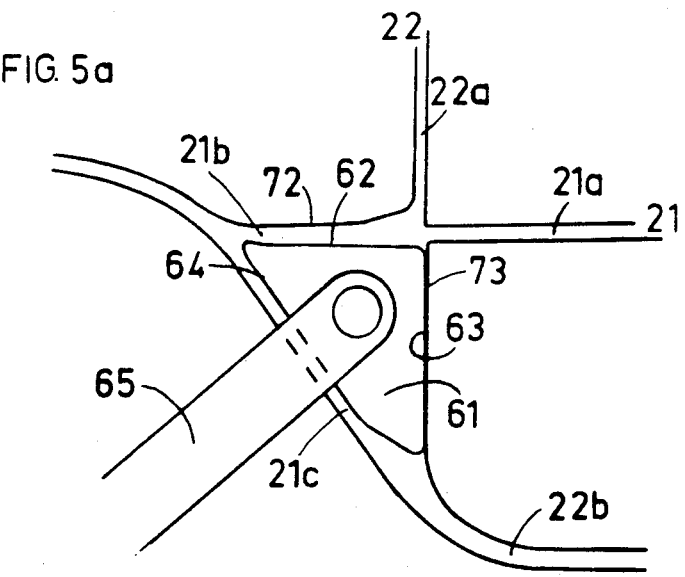
FIG. 5a shows a slidable guide member in a first position.
Figure 5B:
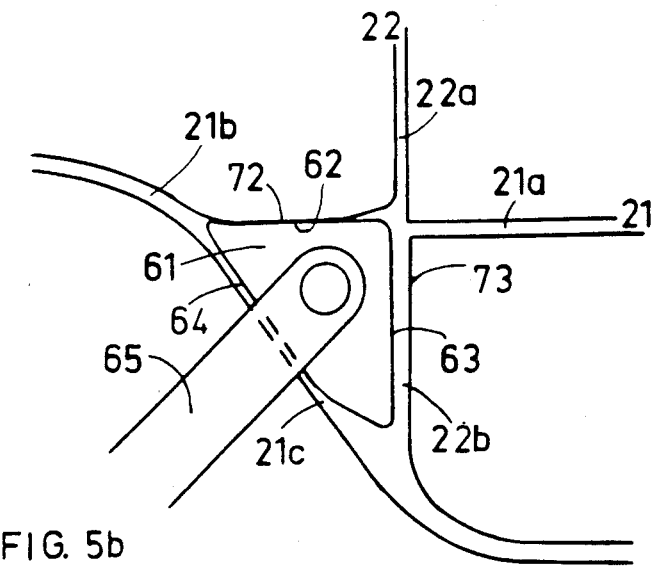
FIG. 5b shows the slidable guide member of FIG. 5a in a second position.

FIGS. 5a and 5b show two different positions of a slidable guide member used in the present invention. This embodiment, preferably, comprises an element 61 extending over the working width of the feed device and moveable by means of arm member 65. The element 61 has at least two adjoining sides 62 and 63 and is slidable between each of two positions. The first side 62 forms part of the guide means of the first conveyor path 21 and the second side 63 forms part of the guide means of the second conveyor path 22. FIG. 5a shows element 61 in the first position wherein the second side 63 is adjacent to its corresponding path-guide 73 to block the entrance to the second discharge section 22b. While in this position, first side 62 forms a path-guide adjacent the first conveyor path 21 to guide sheets coming from the feed section 21a into the discharge section 21b.

In the second position shown in FIG. 5b, the first side 62 of the element 61 is adjacent to its corresponding path-guide 72 thereby blocking the entrance to the first discharge section 21b. While in this position, second side 63 forms a path-guide adjacent the second conveyor path 22 to guide sheets coming from feed section 22a into the discharge section 22b. Each side 62 and 63 of the guide element may have a shape matching the shape of the corresponding path-guide 72 and 73, respectively, so that each side 62 and 63 can be contiguous to and mesh with the corresponding path-guide 72 and 73.

Preferably, guide element 61 further comprises a third side 64 forming part of the guide means of a third conveyor path 21c which does not pass through the intersection of conveyor paths 21 and 22 but which connects parts of both conveyor paths 21 and 22. One part of the second conveyor path 22 may comprise an inverter by means of which the movement of sheets is reversed. A sheet can be conveyed to the inverter via conveyor path 22 when the guide element 61 has been set into the second position as shown in FIG. 5b. Thereafter, the guide element 61 is moved into the first position as shown in FIG. 5a. In this position, part of the second conveyor path 22 is blocked so that the sheet can be conveyed unobstructedly to the first conveyor path 21 via the third conveyor path 21c. When the guide element 61 has been set into the second position, part of the first conveyor path 21 is blocked and a sheet can be conveyed unobstructedly to the second conveyor path 22 via the third conveyor part 21c.

While a presently preferred embodiment of practicing the invention has been shown and described with particularity in connection with the accompanying drawings, the invention may otherwise be embodied within the scope of the following claims.

What is claimed is:

1. In a device for conveying sheets having a plurality of guide means which form a first sheet conveyor path and a second sheet conveyor path such that the first and second sheet conveyor paths form an intersection and each sheet conveyor path has its own feed section and its own discharge section situated on either side of the intersection, the improvement comprising a guide member at the intersection which can be moved between two positions such that in a first position it keeps open an entrance to a discharge section of the first sheet conveyor path while at the same time it blocks an entrance to a discharge section of the second sheet conveyor path and in a second position it blocks the entrance to a discharge section of the first sheet conveyor path and keeps open the entrance to a discharge section of the second sheet conveyor path, and wherein the guide member further comprises a slidable element which extends over the working width of the device and has a plurality of adjoining sides, a first side forming part of the guide means of the first sheet conveyor path and a second side forming part of the guide means of the second sheet conveyor path such that in the first position, the second side is adjacent to a corresponding guide means of the second sheet conveyor path and thereby blocks the entrance to the discharge section of the second sheet conveyor path and in the second position, the first side is adjacent to a corresponding guide means of the first sheet conveyor path and thereby blocks the entrance to the discharge section of the first sheet conveyor path.

2. A device as described in claim 1 wherein the first and second sides of the guide member match the corresponding guide means of the first and second sheet conveyor paths.

3. A device as described in claim 1 wherein the slidable element further comprises a third side forming part of a guide means of a third sheet conveyor path which does not pass through the intersection of the first and second sheet conveyor paths but which connects both sheet conveyor paths such that in the first position, the entrance to the discharge section of the second sheet conveyor path is blocked and in the second position, the entrance to the discharge section of the first sheet conveyor path is blocked.

* * * * *